United States Patent
Takeshima et al.

(10) Patent No.: US 8,034,743 B2
(45) Date of Patent: Oct. 11, 2011

(54) METHOD FOR PRODUCTION OF AN EXHAUST GAS PURIFICATION CATALYST SUPPORT AND EXHAUST GAS PURIFICATION CATALYST SUPPORT

(75) Inventors: Shinichi Takeshima, Numazu (JP); Akio Koyama, Yokohama (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 62 days.

(21) Appl. No.: 12/665,119

(22) PCT Filed: Jun. 25, 2008

(86) PCT No.: PCT/JP2008/061934
§ 371 (c)(1),
(2), (4) Date: Dec. 17, 2009

(87) PCT Pub. No.: WO2009/001962
PCT Pub. Date: Dec. 31, 2008

(65) Prior Publication Data
US 2010/0248957 A1    Sep. 30, 2010

(30) Foreign Application Priority Data
Jun. 27, 2007 (JP) .................. 2007-169176

(51) Int. Cl.
*B01J 21/04* (2006.01)
*B01J 21/06* (2006.01)

(52) U.S. Cl. ........ 502/439; 502/349; 502/355; 423/352; 423/610; 423/624

(58) Field of Classification Search .................. 502/349, 502/355, 439; 423/352, 610, 624; *B01J 21/04, B01J 21/06*
See application file for complete search history.

(56) References Cited

U.S. PATENT DOCUMENTS

| | | | | |
|---|---|---|---|---|
| 3,928,236 A | * | 12/1975 | Rigge et al. | 252/463 |
| 6,495,488 B2 | * | 12/2002 | Yamaguchi et al. | 502/238 |
| 6,806,225 B1 | | 10/2004 | Ikeda et al. | |
| 7,842,641 B2 | * | 11/2010 | Fu et al. | 502/242 |

(Continued)

FOREIGN PATENT DOCUMENTS

JP    6-28719    4/1994

(Continued)

OTHER PUBLICATIONS

English translation of Yukio et al (JP2001-009279).*

(Continued)

*Primary Examiner* — Melvin Mayes
*Assistant Examiner* — Jun Li
(74) *Attorney, Agent, or Firm* — Finnegan, Henderson, Farabow, Garrett & Dunner, LLP (57) ABSTRACT

To provide a method of production of an exhaust gas purification catalyst support preventing a drop in the heat resistance of alumina or other catalyst support due to the presence of titania and provided with a sulfur poisoning suppression action by titania and an exhaust gas purification catalyst support produced by the same. A method of production of an exhaust gas purification catalyst support comprising, in a basic solution, making alumina particles adsorb ammonium ions and then bringing titania sol into contact with the alumina particle so as to make the alumina particles adsorb the titania particles. An exhaust gas purification catalyst support where at least base points on the alumina particle surfaces adsorb titania particles and the pH does not rise when immersed in an ammonium nitrate solution.

1 Claim, 4 Drawing Sheets

U.S. PATENT DOCUMENTS

2005/0164880 A1* 7/2005 Gesenhues et al. .......... 502/350

FOREIGN PATENT DOCUMENTS

| JP | 2001-9279 | 1/2001 |
| JP | 2004-33819 | 2/2004 |
| JP | 2004-321847 | 11/2004 |
| JP | 2004-331444 | 11/2004 |
| JP | 3821521 | 6/2006 |
| WO | WO00/00283 | 1/2000 |

OTHER PUBLICATIONS

Machine translation of Nagata et al (JP2004-331444).*

Sivakumar, S. et al., "Nanoporous titania-alumina mixed oxides—an alkoxide free sol-gel synthesis," Materials Letters, vol. 58, Jun. 9, 2004, pp. 2664-2669.

Morán-Pineda, M. et al., "$Al_2O_3$-$TiO_2$ Sol-Gel Mixed Oxides as Suitable Supports for the Reduction of NO by CO," React. Kinet. Catal. Lett., vol. 76, No. 1, (2002), pp. 75-81.

Kong, D. et al., "Dispersion behavior and stabilization mechanism of alumina powders in silica sol," Materials Letters, vol. 58, (2004), pp. 3503-3508.

Extended European Search Report for EP Appl. No. 08765860.5 dated May 25, 2011.

* cited by examiner

METHOD FOR PRODUCTION OF AN EXHAUST GAS PURIFICATION CATALYST SUPPORT AND EXHAUST GAS PURIFICATION CATALYST SUPPORT

CROSS-REFERENCE TO RELATED APPLICATIONS

This application is a national phase application of International Application No. PCT/JP2008/061934, filed Jun. 25, 2008, and claims the priority of Japanese Application No. 2007-169176, filed Jun. 27, 2007, the contents of both of which are incorporated herein by reference.

TECHNICAL FIELD

The present invention relates to a method of production of an exhaust gas catalyst support and an exhaust gas purification catalyst support provided with the action of suppressing a drop in heat resistance and suppressing sulfur poisoning.

BACKGROUND ART

A lean burn engine is characterized by being fuel efficient, but a normal three-way catalyst cannot purify $NO_X$ in a lean air-fuel ratio region (oxygen excess atmosphere). An $NO_X$ storage reducing catalyst developed with a new purification principle is able to purify $NO_X$ in the lean region and comprises a normal three-way catalyst with an additional alkali metal, alkali earth metal, etc. as material that holds $NO_X$ (storing/adsorbing material). Under normal operation at a lean air-fuel ratio, $NO_X$ is oxidized by excess oxygen on the catalyst precious metal to become $NO_2$ and is held on the $NO_X$ holding material as nitrates etc. Further, by briefly making the air-fuel ratio rich (fuel excess atmosphere), the nitrates etc. are reduced by CO and HC on the catalyst precious metal to be purified and expelled as $N_2$.

An $NO_X$ storage reducing catalyst is produced by forming an alumina or other catalyst support layer (coat layer) on cordierite or another base material and making this carry Pt or another catalyst precious metal and K or another $NO_X$-holding material. Generally, a catalyst support layer is formed by adding titania ($TiO_2$) to alumina ($Al_2O_3$), zirconia ($ZrO_2$), ceria ($CeO_2$), and other such porous support particles so as to suppress the sulfur poisoning distinctive to $NO_X$ storage reducing catalysts. The presence of titania promotes the desorption of $SO_X$ held by the $NO_X$ holding material when regenerating the catalyst from sulfur poisoning in a high temperature rich environment. However, there was the problem that the addition of titania caused a large drop in the heat resistance of the catalyst.

WO00/00283 discloses a $NO_X$ storage reducing catalyst using a support comprising titania and zirconia carrying Rh in advance. It is considered that titania suppresses sulfur poisoning and carrying Rh on $ZrO_2$ improves the purification capability. However, the heat resistance of titania is low, so both the titania itself and the catalyst precious metal easily sinter and the expected improvement in the purification capability cannot be acquired.

Japanese Patent Publication (A) No. 2001-9279 discloses an $NO_X$ storage reducing catalyst using a support comprising alumina particles with surfaces coated by titania particles of particle sizes of 10 nm or less. Further, as a method of producing the same, this discloses to make the pH of a slurry comprised of the alumina particles and titania sol less than 5, then increase the pH to thereby coat the alumina particle surfaces with titania fine particles. However, with the method of production of Japanese Patent Publication (A) No. 2001-9279, as shown by FIG. 10 of Japanese Patent Publication (A) No. 2001-9279, the titania sol passes the isoelectric point over the course of increasing the pH, so agglomerates and immediately coarsens at that point. With the pH at this time, the alumina becomes charged and does not agglomerate with the titania sol. Further, when increasing the pH, the titania sol agglomerates begin to become charged negatively. However, in comparison to agglomeration, redispersal requires a long time, so the titania particles are adsorbed on the alumina in the agglomerated and coarsened state. In this way, with the method of production of Japanese Patent Publication (A) No. 2001-9279, there is a high likelihood of the result being not the state with the surfaces of the alumina particles being covered with titania fine particles, but the result with the alumina particle and agglomerated titania particles simply being mixed together.

Japanese Patent Publication (A) No. 2004-321847 discloses an $NO_X$ storage reducing catalyst using a support obtained by calcining an alumina/titania composite oxide prepared by a coprecipitation method carrying a titania precursor. However, titania has a low heat resistance, so a sufficient heat resistance is not acquired.

Further, even in a three-way catalyst, sulfur deposits on the catalyst support as sulfates, so there is the smell of $H_2S$ generated under idling conditions etc. after high speed driving.

In this way, if adding titania to a catalyst support, the heat resistance of the catalyst drops in comparison to the case where no titania is added, so the effect of suppression of sulfur poisoning brought about by addition of titania and the purification capability inherent to the catalyst cannot both be achieved.

DISCLOSURE OF THE INVENTION

The present invention has as its object to provide a method of production of an exhaust gas purification catalyst support preventing a drop in heat resistance of the alumina or other catalyst support due to the presence of titania and provided with the action of suppressing sulfur poisoning by titania and such an exhaust gas purification catalyst support.

To achieve the above object, according to the present invention, there is provided a method of production of an exhaust gas purification catalyst support comprising, in a basic solution, making alumina particles adsorb ammonium ions and then bringing titania sol into contact with the alumina particle so as to make the alumina particles adsorb the titania particles.

Further, according to the present invention, there is provided an exhaust gas purification catalyst support where at least base points on the alumina particle surfaces adsorb titania particles and the pH does not rise when immersed in an ammonium nitrate solution.

By making alumina particles on which ammonium ions have been adsorbed adsorb fine titania particles forming a sol, the support frame structure of the alumina is not changed, so the heat resistance of the titania particles on the alumina also improves, whereby the heat resistance of the entire catalyst improves and high catalyst capability can be demonstrated.

BEST MODE FOR CARRYING OUT THE INVENTION

The inventors guessed that the reason why the heat resistance of the support as a whole drops if adding titania to alumina etc. originally having a high heat resistance is as follows.

The prior art of WO00/00283 forms the titania by a solution reaction using Ti ions (sulfates etc.), Ti organic metals (alkoxides), etc. as Ti sources. When combining these Ti sources combine and alumina or other high heat resistant particles, for example, the Ti enters between the alumina primary particles or secondary particles in the form of ions. These parts are deviate from the composition of alumina and become alumina and titania composite oxides, so the heat resistance drops. The particles easily become rearranged thereby inviting a decrease of the support surface area at high temperatures. The decrease of the support surface area induces agglomeration of the carried catalyst precious metal and $NO_X$ holding material as well whereby the catalyst performance remarkably falls.

The present invention, based on the thinking, does not bring Ti into contact with alumina or other high heat resistance particles in the form of ions or complex ions, alkoxides, or other organic metal compounds, but brings titania sol into contact with the alumina to make titania particles be adsorbed on the alumina particles from the start, so the heat resistance deterioration mechanism described again does not occur and heat resistance as a support is secured.

However, if just adding active alumina to a titania sol aqueous solution, only some of the titania fine particles forming the sol will be adsorbed at the active alumina particles. This is because titania sol, unlike calcined titania, has an isoelectric point that is close to neutral, so potential adsorption with alumina, which has similar charging characteristics, does not easily occur.

Further, as shown in Japanese Patent Publication (A) No. 2001-9279, with the method of raising the pH from the acidic side, as mentioned above, agglomeration and coarsening of the titania sol will unavoidably occur when passing the isoelectric point during the process of raising the pH, so the result will be a state where agglomerated and coarsened titania particles are simply be mixed with the alumina particles.

In the present invention, the alumina particles are made to adsorb ammonium ions ($NH_4^+$) in a basic solution, and the alumina particles are made to adsorb titania fine particles that form the sol. This is possible with the mechanism laid out below.

That is, even with basic titania sol, the charging characteristics are similar to alumina. However, the $NH_4^+$ ion adsorption abilities of titania sol and alumina are completely different. $NH_4^+$ ions are adsorbed on alumina so increasing the $NH_4^+$ ion concentration lowers the negative charge of alumina. $NH_4^+$ ions are not adsorbed on titania, which is superhydrophilic and has high adsorption power for $OH^-$, so even if the $NH_4^+$ ion concentration is increased, the negative electric charge is not reduced. That is, it is believed that with alumina, $NH_4^+$ ions are adsorbed on the surface whereby portions of the surface layer will become a positive charge and will be able to adsorb the titania sol which is negatively charged.

The only parts of the surface layer that will have a positive charge are the alumina particles, while the titania particles will remain with a negative charge, so it is inferred that potential adsorption will only occur between the alumina and titania and will not occur between the alumina particles themselves or the titania particles themselves.

Thus for the first time, a state can be realized where high heat resistant alumina particles adsorb titania fine particles. Typically, it is thought that alumina particles are secondary particles of a size of tens of nm made up of an agglomerate of 10 nm or smaller primary particles and that the surfaces adsorb primary particles of titania of about 10 nm forming the sol.

The thus obtained alumina on which titania fine particles are adsorbed are then filtered, rinsed, and dried, then calcined to obtain a catalyst support comprising alumina carrying titania fine particles. In the past, agglomeration of the titania and agglomeration of alumina accompanying the same occurred during the calcining step or at time of heat resistance and therefore the catalyst performance greatly dropped.

As opposed to this, the catalyst support of the present invention has an extremely stable structure of an alumina frame on which titania fine particles are adsorbed. Agglomeration does not occur during calcining or heat resistance, whereby the alumina frame maintains the initial high surface area state and, further, the titania carried by it also maintains the fine particle state derived from the sol.

Alumina particles have base points. The base points have the property of adsorbing sulfur, so become a cause of sulfur poisoning. In the present invention, the fine titania particles bond with and mask the base points of the alumina surface, so sulfur poisoning is prevented (or lightened). As opposed to this, in the prior art, the titania particles agglomerated and coarsened making bonding with the base points difficult, so the effect of prevention of sulfur poisoning was low.

Whether titania is masking base points of alumina can be judged by the rise in pH with immersion in an ammonium nitrate ($NH_4NO_3$) solution. That is, when titania ($TiO_2$) bonds with alumina base points, even when immersed in an $NH_4NO_3$ solution, the adsorption of $NH_4^+$ ions and $NO_3^-$ ions on the alumina is weak and the pH does not change substantially. As opposed to this, when titania ($TiO_2$) does not bond at the alumina base points, the $NO_3^-$ ions are partially adsorbed on the alumina base points. Due to this, $OH^-$ ions that were originally configured peel off and are released, so the pH rises. Thus, if there is no or only a small change in pH, it can be judged that there is titania masking, while if the pH rises, it can be judged that there is no titania masking.

In the present invention, by using titania sol, the base points of alumina particles can be masked by titania fine particle, and sulfur poisoning can be effectively prevented.

Note that, the catalyst support of the present invention can be configured comprising a main body of alumina as a frame component and zirconia, ceria, and other frame components added to it depending on necessity. Such frame components are, for example, active alumina, zirconia compound oxides, ceria compound oxides, etc. with high surface areas. Further, rare earth-added active alumina, Ba-added active alumina, etc. with $NO_X$ holding materials added to the frame components can be used.

An $NO_X$ storage reducing catalyst using the catalyst support of the present invention can be produced with a conventional method. That is, typically, (1) a cordierite or other base material is coated with a slurry comprising a catalyst support of the present invention, then dried and calcined to form a catalyst support layer (coat layer), (2) this coat layer is immersed in a solution of Pt, Rh, Pd, or another catalyst precious metal, dried, then calcined to make it carry a catalyst precious metal, and (3) further this is immersed in a solution of an alkali metal, alkali earth metal, rare metal, or other $NO_X$ holding material, dried, then calcined to make it carry the $NO_X$ holding material.

EXAMPLES

Example 1

According to the present invention, catalyst supports were prepared by the following procedure and conditions.

(1) Preparation of Titania Sol

Of the methods disclosed in Japanese Patent Publication (A) No. 7-232925, that is, the method bringing the titania powder into contact with a positive ion exchanger in a water phase in the presence of an acid and the method of bringing it into contact with a negative ion exchanger in the presence of an alkali, the latter method was used to prepare the basic titania sol. The titania sol used was a commercially available one made by Catalysts and Chemicals Ind. with a particle size of 10 nm and an anatase crystal structure. The sol was diluted to 5 wt % as $TiO_2$ and the pH adjusted to pH10.

(2) Adsorption on Active Alumina

Figure 1:
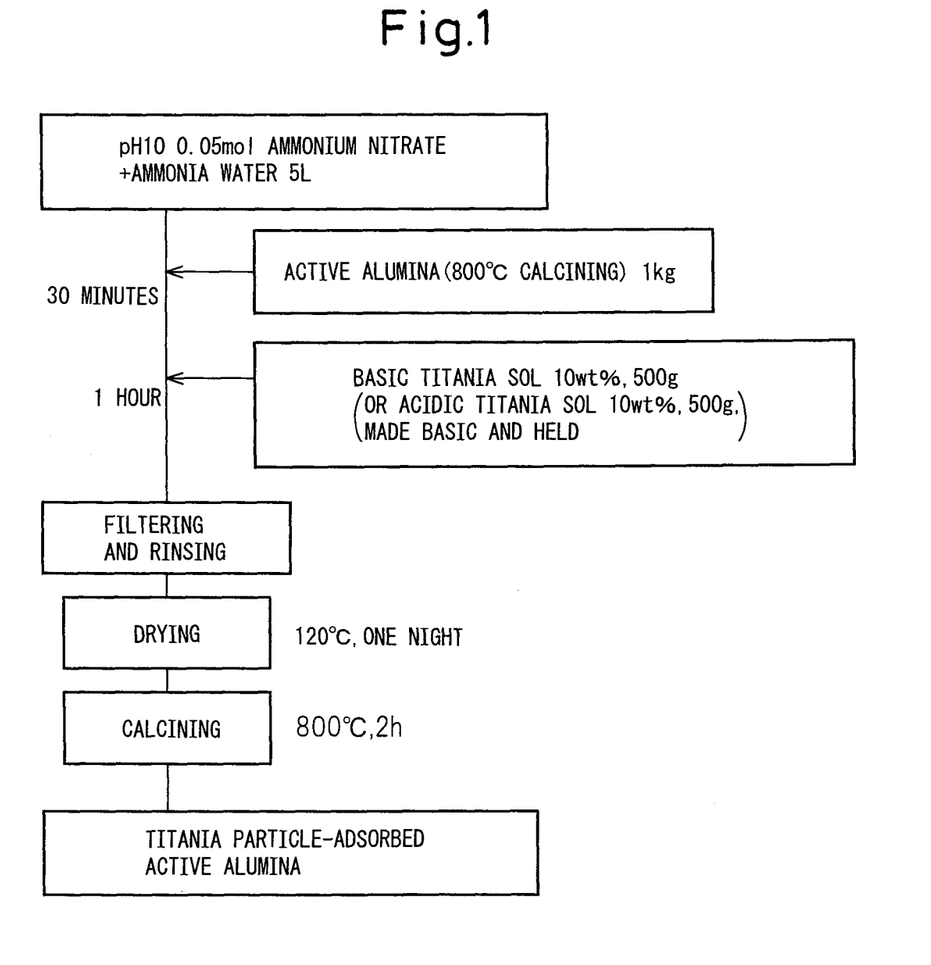
FIG. 1 is a flow chart showing the production steps of a catalyst support according to Example 1 of the present invention.

Using the procedure shown in the flow sheet shown in FIG. 1, the titania sol prepared by the above was adsorbed on active alumina.

Here, the procedure was carried out so that Ti/Al=5/100 (atom ratio).

First, 5 L of an aqueous solution of 0.05 mol/L ammonium nitrate+ammonia water and a pH10 was prepared. 1 kg of dried active alumina (made by WR Grace) was added to the solution, which was then stirred to fill the solution in the powder pores. After about 30 minutes, 1567 g of the above diluted basic titania sol was gradually added. The entire amount was added in approximately 5 minutes. Then, the solution continued to be stirred for 1 hour. This was filtered, rinsed once, then dried at 120° C. over night. Then, the result was calcined at 800° C. for 2 hours. From the weight after calcining, it could be confirmed that nearly the entire amount of titania sol was carried.

Note that, in the present example, basic titania sol was used, however, acidic titania sol may also be used. In such a case, it can be made basic by the following pretreatment. That is, 500 g of 10 wt % acidic titania sol is added to 800 ml of 0.3 mol/L ammonia water, the solution is adjusted to pH10 by ammonia water, and the result continues to be stirred for at least 2 h. After applying pretreatment in this way, the same treatment as the above basic sol is carried out.

Comparative Example 1

Dried active alumina was added to distilled water and stirred, then the solution was filtered and the weight was measured to find the absorption rate. Next, a titanium isopropoxide ethanol solution prepared in advance was prepared. The dried alumina powder was made to absorb the titanium isopropoxide ethanol solution so that the concentration became Ti/Al=5/100 (atomic ratio) based on the absorption rate. Afterwards, the solution was filtered, dried at 80° C., then calcined at 800° C. for 2 hours.

Comparative Example 2

General acidic titania sol (made by Ishihara Sangyo) was prepared, and some water was added to it enough so that added dried alumina can be immersed in it. The solution was stirred for 1 hour, then was heated to gradually evaporate the water. The heating was continued even after the result could no longer be stirred so as to completely dry it, then the result was calcined at 800° C. for 2 hours.

In Comparative Example 2, even when adding active alumina to the titania sol aqueous solution and stirring, only some titania sol was adsorbed on the active alumina. This is because titania sol, unlike calcined titania, has an isoelectric point that is close to neutral, so potential adsorption with alumina, which has similar charging characteristics, does not easily occur. To secure the amount carried, heating, condensing, and drying are carried out, however, the majority of titania particles agglomerate with other titania particles.

As opposed to this, in Example 1 of the present invention, as explained already, due to the adsorption selectivity of $NH_4^+$ ions being adsorbed on the alumina easily and being adsorbed on titania sol with difficulty, the alumina surface layer becomes partially positively charged, while the titania sol surface layer maintains a negative charge, so the titania sol is potentially adsorbed on the alumina. During this, no potential adsorption occurs between alumina particles themselves and titania particles themselves. As a result, a state is acquired where titania having a sol-derived fine particle state is adsorbed on an alumina frame.

Figure 2:
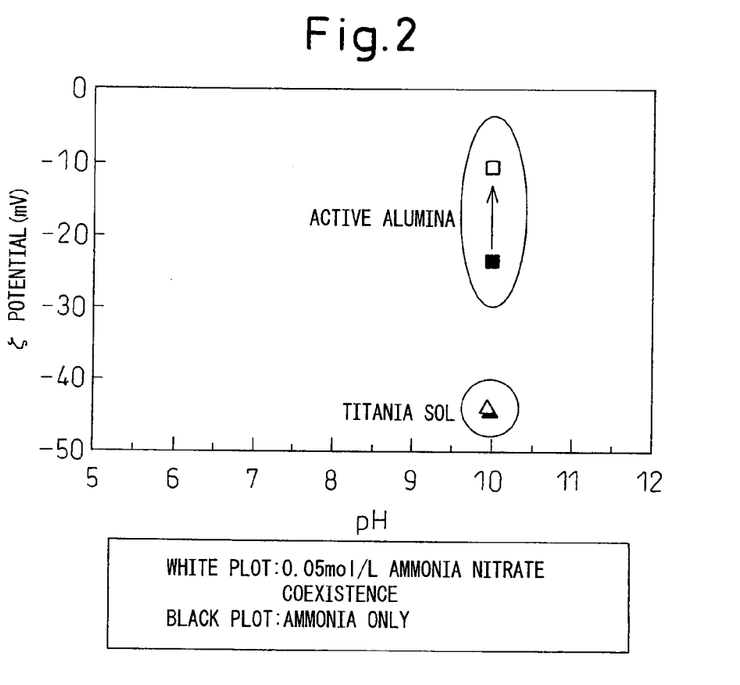
FIG. 2 is a graph showing the displacement of potential of active alumina and titania sol due to coexistence of ammonium ions.

As an example, FIG. 2 compares and shows the displacement of $\zeta$ potential due to coexistence with $NH_4^+$ ions for active alumina and titania sol. For measurement, samples were used wherein the sol and support were dispersed in distilled water, then the pH was adjusted and the solution stabilized for 1 hour.

As shown, active alumina decreases greatly in negative $\zeta$ potential of due to coexistence with $NH_4$ ions, while titania sol does not substantially change in $\zeta$ potential due to coexistence with $NH_4^+$ ions. It is learned that there is a remarkable difference in the potential difference between the two. This is because, as mentioned earlier, $NH_4^+$ ions are selectively adsorbed on the active alumina. Due to the potential difference, titania sol is adsorbed on the active alumina.

<Support Surface Area>

The surface areas of the catalyst supports prepared in Example 1, Comparative Example 1, and Comparative Example 2 were measured by the nitrogen adsorption method. The measurement results are shown in Table 2. Note that, for comparison, the surface areas are provided for the titania powder (initial anatase) and active alumina used as materials.

TABLE 1

Support Surface Area (when calcining at 800° C. for 2 hours)

| Type | Support type | Surface area $(m^2/g)$ |
|---|---|---|
| | Titania (initial anatase) | 22.1 |
| Comparative Example 1 | Ti alkoxide on active alumina* | 123.0 |
| Comparative | Active alumina + acidic titania | 160.4 |

TABLE 1-continued

Support Surface Area (when calcining at 800° C. for 2 hours)

| Type | Support type | Surface area (m²/g) |
|---|---|---|
| Example 2 | sol evaporated to dryness* | 165.2 |
| Example 1 | Active alumina + titania sol adsorption* | |
| | Active alumina | 180.5 |

*Ti/Al mol ratio = 5/100

The catalyst support of Example 1 has the smallest drop in surface area with respect to the active alumina. As opposed to this, the catalyst support of Comparative Example 1 in which the same amount of Ti was added as in Example 1 has an extremely large drop in surface area. In Comparative Example 2, the drop in surface area is low, but HC reforming ability drops as shown next.

<Steam Reforming Reaction>

Titania is effective for activation of hydrocarbons. It is thought that the following steam reforming reaction is accelerated.

$$C_mH_n + mH_2O \rightarrow mCO + (2m+n)/2 \cdot H_2$$

The strong reduction action of the produced hydrogen and CO promotes the reduction and desorption of the sulfur poisoned as sulfate.

The catalyst supports of Example 1, Comparative Example 1, and Comparative Example 2 were used to prepare $NO_X$ storage reducing catalysts by the following procedure. However, for Example 1, an Application Example 1 in which a zirconia/titania compound oxide was added to the catalyst support composition of Example 1 and an Application Example 2 in which an $NO_X$ holding material was increased more than Example 1 to deal with surface areas larger than Application Example 1 were prepared. Further, a catalyst using a conventional catalyst support was also prepared.

<Procedure for Preparation of $NO_X$ Storage Reducing Catalyst>

A 2 L 400 cell/in² monolithic base material was dipped using a support slurry coat method, dried, and calcined. This was made to adsorb and carry Pt—Rh by the known impregnation method and was calcined. Further, as an $NO_x$ storage material, this was made to absorb and carry an aqueous solution of Ba and alkali metal salts, dried, then calcined to obtain the catalyst.

For each $NO_X$ storage reducing catalyst, the conversion rate of the excessive HC to CO at the time of a rich pulse was measured under the following conditions.

<Measurement Conditions of HC/CO Conversion Rate>

The HC steam reforming ability was found by switching from a lean operation to rich operation and from the average $HC + H_2O \rightarrow CO + H_2$ reaction for 5 seconds. Under a lean operation, an A/F=21 equivalent gas was used, and under a rich operation, an A/F=14 equivalent gas was used.

The measurement results for the catalyst supports are shown together in Table 2.

TABLE 2

| Type | | Catalyst support | After heat endurance Conversion rate of excess HC to CO at rich pulse ($C_{CO}$/total C %, 400° C.) | After heat endurance + sulfur poisoning regeneration $NO_X$ purification rate (%, 400° C.) | |
|---|---|---|---|---|---|
| Comparative Example 1 | | Active alumina carrying Ti alkoxide, 200 parts | 14.0 | 45.5 | 41.2 |
| Comparative Example 2 | | Alumina carrying titania fine particles by evaporation to dryness, 200 parts | 3.2 | 65.4 | 35.4 |
| Conventional Example | | Active alumina, 120 parts, Zirconia/titania compound oxides, 120 parts | 3.2 | 59.5 | 41.5 |
| Ex. 1 | Application Example 1 | Active alumina adsorbing titania fine particles, 120 parts, Zirconia/titania compound oxides, 120 parts | 45.9 | 85.7 | 81.9 |
| | Application Example 2 | Active alumina adsorbing titania fine particles, 200 parts | 74.3 | 89.6 | 84.4 |

Note:
Pt, Rh carried amounts 2, 0.3 g/L, $NO_X$ storage material, alkali content 0.25 mol/L, Ba 0.1 mol/L
(However, Application Example 2 is Ba 0.18 mol/L)

As is clear from the results of Table 2, Application Examples 1 and 2 of Example 1 show a remarkable increase in conversion rate to CO compared with Comparative Examples 1 and 2 and the conventional example.

Further, in Table 2, the $NO_X$ purification rates [after heat endurance] and [after heat endurance+sulfur poisoning regeneration] are also described. The conditions for heat endurance and sulfur poisoning regeneration were as follows.

<Heat Endurance Conditions>

The heat endurance was calcining in the air at 750° C. for 20 hours.

<Sulfur Poisoning Regeneration Conditions>

The sulfur poisoning test poisoned the catalyst by $SO_2$ gas+A/F=21 equivalent gas for 1 L of catalyst. The S passing amount was set as 24 g/L-cat for sulfur. The regeneration conditions of sulfur poisoning consisted of 10 minutes of a repetition of running A/F=14 equivalent gas for 30 seconds at 600° C. and switching to A/F=21 equivalent gas for 10 seconds.

As shown in Table 2, the $NO_X$ reduction abilities and sulfur desorption abilities of Application Examples 1 and 2 of Example 1 are significantly improved compared with Comparative Examples 1 and 2 and the conventional example.

<Raman Analysis>

Figure 3:
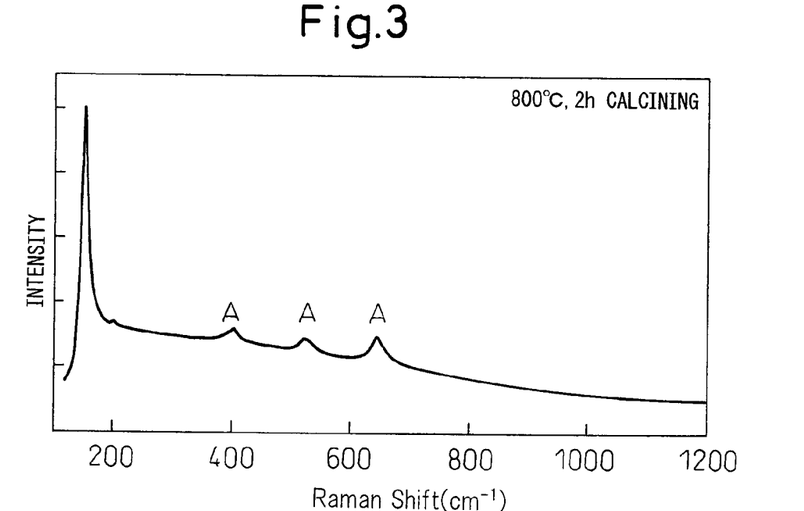
FIG. 3 is a Raman analysis chart of Example 1 of the present invention.

In such a way, Example 1 is provided with an extremely high catalyst activity, so to examine the form of carried titania ($TiO_2$) particles, Raman analysis was conducted. The results are shown in FIG. 3.

According to conventional knowledge, the crystal structure of titania transforms at a high temperature of more than 600° C. from an anatase structure to a rutile structure and coarsening occurs due to agglomeration along with that (heat resistance drops).

As opposed to this, in Example 1 of the present invention, regardless of calcining at 800° C. for 2 hours, the anatase structure of titania was maintained. That is, the peak indicated by A in the drawing is the peak of the anatase structure. The broadness of the peak indicates that the particles are fine. Thus, according to the method of the present invention, titania is completely adsorbed on the alumina, and the heat resistance of alumina did not drop. Hence, it could be confirmed that titania particles, at a state when adsorbed on alumina, maintain a highly active anatase structure while remaining as fine particles.

Example 2

The catalyst support of the present invention prepared in Example 1 was impregnated with 1 wt % Pt to prepare a three-way catalyst (referred to as "Pt/titania fine particle adsorbed alumina catalyst").

For comparison purposes, a commercially available ceria-zirconia catalyst support (Ce 40 at % with respect to the total metal [Ce+Zr]) was impregnated with 1 wt % of Pt to prepare a three-way catalyst (referred to as "Pt/ceria-zirconia catalyst").

The prepared three-way catalysts were subjected to sulfur positioning tests by running $SO_2$ 100 ppm, $O_2$ 5% full model gas through them for 3 hours.

Figure 4:
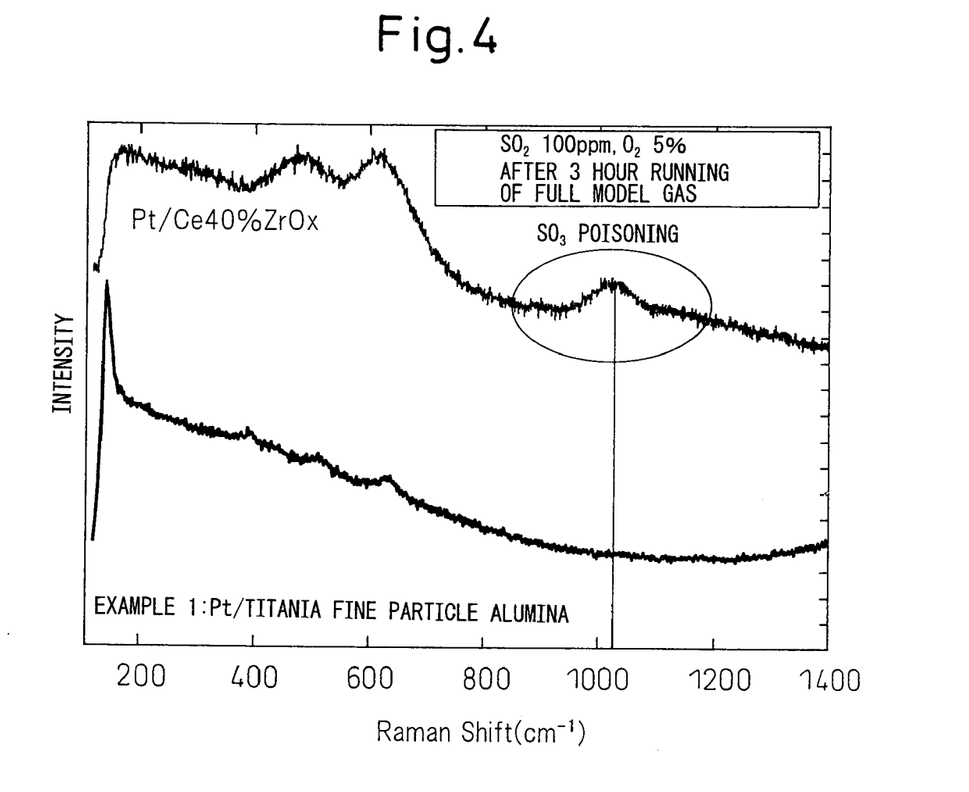
FIG. 4 is a Raman analysis chart of Example 2 of the present invention.

FIG. 4 shows the results of Raman analysis after the sulfur poisoning test.

As shown in the figure, remarkable adsorption of $SO_3$ was observed in the comparative Pt/ceria-zirconia catalyst, while almost no $SO_3$ adsorption was observed in the Pt/titania fine particle-adsorbed alumina catalyst of the catalyst support of Example 1 carrying Pt.

Example 3

Catalyst supports obtained by the method of the present invention and the method of Japanese Patent Publication (A) No. 2001-9279 were compared.

First, according to the present invention, a catalyst support was prepared by the following procedure and conditions.
(1) Preparation of Titania Sol Acidic titania sol was prepared by hydrolysis of a titanium sulfate aqueous solution by ammonia, then adding nitric acid to make the result acidic. The titania sol used was a commercially available STS-100 made by Ishihara Sangyo having an agglomerate particle size of 15 nm and an amorphous structure. The sol was diluted to 5 wt % as $TiO_2$ and adjusted to pH10. It was stirred for a minimum of 2 hours for redispersing the titania sol.
(2) Adsorption on Active Alumina The acidic titania sol prepared in the above was adsorbed on active alumina using the same procedure as Example 1. However, this was filtered by centrifugal separation, rinsed, then dried at 80° C. over night. After this, it was calcined at 800° C. for 2 hours. From the weight after calcining, it could be confirmed that nearly the entire amount of titania sol was carried.

Comparative Example 3

Next, a catalyst support was prepared following Example 1 of Japanese Patent Publication (A) No. 2001-9279. However, the titania sol used was the same as mentioned above and was formulated so as to be Ti/Al=5/100 (atomic ratio).

That is, while stirring, active alumina and titania sol were added to ion-exchange water adjusted to pH2 by nitric acid and mixed. To the obtained slurry, ammonia water was dropped to adjust the pH to 7 while stirring. Then, the result was filtered by centrifugal separation and rinsed, then dried at 80° C. over night. After this, it was calcined at 800° C. for 2 hours.

The catalyst supports prepared in Example 3 and Comparative Example 3 were measured for surface area by the nitrogen adsorption method and were analyzed by Raman analysis.
<Support Surface Area>

The measurement results of the surface areas are shown in Table 3. Note that, for comparison purposes, the surface area for the active alumina only before titania adsorption is also provided.

TABLE 3

Support Surface Area (When Calcining at 800° C. for 2 Hours)

| Type | Support type | Surface area ($m^2$/g) |
|---|---|---|
| | Active alumina | 195.2 |
| Example 3 | Active alumina + titania sol adsorption (*2) | 190.1 |
| Comparative Example 3 | Active alumina + titania sol absorption (*2) (*3) | 175.9 |

(*2): Acidic titania sol (amorphous), Ti/Al mol ratio = 5/100
(*3): Conditions of Example 1 of Japanese Patent Publication (A) No. 2001-9279 (pH rise from pH 5 to pH 7)

As shown in Table 3, with heating of 800° C.×2 h, the support of Example 3 according to the method of the present invention did not drop much at all in surface area in comparison to before heating. As opposed to this, the support of Comparative Example 3 according to the method of Japanese Patent Publication (A) No. 2001-9279 showed a remarkable drop in surface area in comparison to before heating.
<Raman Analysis Results>

Figure 5:
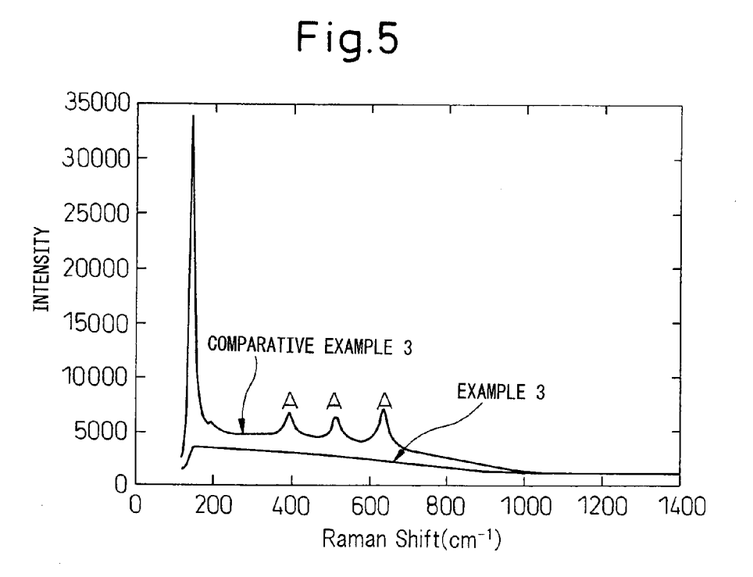
FIG. 5 is a Raman analysis chart of Example 3 of the present invention and a Comparative Example 3 of the prior art.

FIG. 5 shows the results of Raman analysis of the different catalyst supports after calcining at 800° C. As shown by A in the figure, the catalyst support of Comparative Example 3 (Japanese Patent Publication (A) No. 2001-9279) was observed to have an anatase-type peak as described in Japanese Patent Publication (A) No. 2001-9279. The peak intensity is extremely strong. This indicates that it is a coarsened anatase-type titania crystal. That is, with the method of Comparative Example 3 (Japanese Patent Publication (A) No. 2001-9279), the initial amorphous structure is lost and an anatase-type crystal is changed to.

As opposed to this, the catalyst support of Example 3 according to the present invention had no peak recognized at all. The initial amorphous structure was maintained even after 800° C. calcining. It is believed that this is because, in the present invention, fine titania particles are strongly bonded to the alumina particles, so the alumina particles maintained the amorphous structure even during 800° C. calcining, whereas in the method of Comparative Example 3 (Japanese Patent Publication (A) No. 2001-9279), the titania particles agglomerated and coarsened, so the majority of titania particles bonded to the alumina particles weakly, so the alumina particle sintered and crystallized during 800° C. calcining.

Example 4

Tests were conducted to confirm the effects of masking of titania particles on the alumina particle base points.

<Preparation of Samples>

Using the same procedure and conditions as Example 1, titania sol was prepared and adsorbed on active alumina so as to prepare a titania fine particle-adsorbed alumina catalyst support.

For comparison, a sample of only active alumina particles was also prepared.

<Test>

Figure 6:
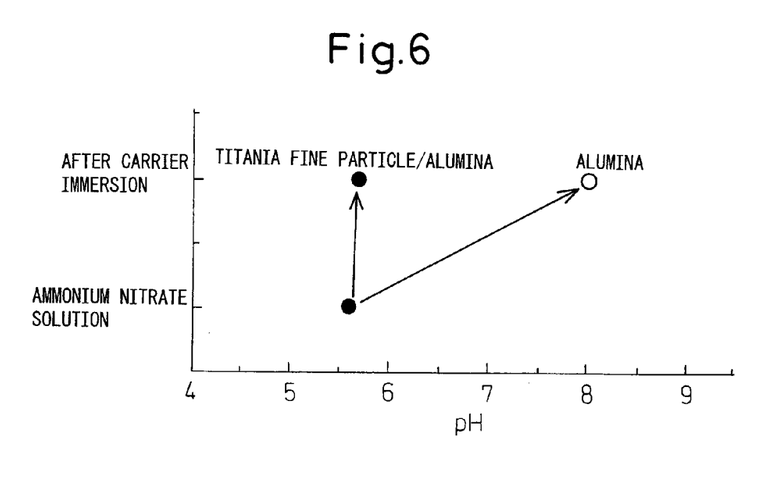
FIG. 6 is a graph showing the change in pH after charging into an ammonium nitrate solution for Example 4 of the present invention and a comparative test piece.

Distilled water was used to dilute an ammonium nitrate solution to a concentration of 0.15 mol/L, whereupon the pH became 5.6. The sample of the above titania fine particle-adsorbed alumina catalyst support and the sample of the active alumina alone were charged into this in amounts of 25 g/100 mL, then the pH's were measured. The results are shown in FIG. 6.

As shown in the figure, when charging the titania fine particle-adsorbed alumina catalyst support of the present invention, the pH of the ammonium nitrate solution did not substantially change. As opposed to this, when charging only active alumina, the pH rose to 8.0. The reason is believed to be as follows.

In the titania fine particle-adsorbed alumina catalyst support of the present invention, titania ($TiO_2$) bonds with the alumina base points, so even when immersed in an $NH_4NO_3$ solution, the adsorption of $NH_4^+$ ions and $NO_3^-$ ions on the alumina is weak, so the pH does not change substantially.

As opposed to this, in the alumina only sample, titania ($TiO_2$) does not bond with the alumina base points, so the $NO_3^-$ ions are partially adsorbed on the alumina base points. Due to this, the originally coordinated $OH^-$ ions are desorbed, so the pH rises.

Therefore, if there is no substantial pH change, it can be judged that there is masking by titania, while if the pH rises, it can be judged that there is no masking by titania.

According to the present invention, by using titania sol, it is possible to mask the alumina particle base points with titania fine particles and effectively prevent sulfur poisoning.

INDUSTRIAL APPLICABILITY

According to the present invention, there is provided a method of production of an $NO_X$ storage reducing catalyst preventing a drop in heat resistance caused by the presence of titania and provided with a sulfur poisoning suppressing action, HC reforming improvement action, and normal catalyst heat resistance.

On the other hand, there had been the problem in three-way catalysts as well of sulfur sticking on the catalyst supports as sulfates and a smell caused by production of $H_2S$ under idling conditions after high speed driving, however, the support of the present invention has a superior effect of significantly suppressing the sticking of sulfates and thereby almost completely preventing the generation of a smell.

The invention claimed is:

1. A method of production of an exhaust gas purification catalyst support comprising, in a basic solution, making alumina particles adsorb ammonium ions and then bringing a basic titania sol into contact with the alumina particles in the basic solution so as to make the alumina particles adsorb titania particles in the titania sol.

* * * * *